United States Patent
Iwamura et al.

(10) Patent No.: US 7,410,722 B2
(45) Date of Patent: Aug. 12, 2008

(54) COMBINED BATTERY AND BATTERY HOLDING FRAME

(75) Inventors: Akira Iwamura, Kawanishi (JP); Kenji Kimura, Kishiwada (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 529 days.

(21) Appl. No.: 10/511,482

(22) PCT Filed: Jun. 3, 2003

(86) PCT No.: PCT/JP03/07047

§ 371 (c)(1), (2), (4) Date: Oct. 15, 2004

(87) PCT Pub. No.: WO03/107458

PCT Pub. Date: Dec. 24, 2003

(65) Prior Publication Data

US 2005/0130033 A1    Jun. 16, 2005

(30) Foreign Application Priority Data

Jun. 17, 2002    (JP) .............................. 2002-175659

(51) Int. Cl.
*H01M 2/10*    (2006.01)
*H01M 10/50*    (2006.01)

(52) U.S. Cl. ....................... 429/159; 429/100; 429/120; 429/148

(58) Field of Classification Search ............... 429/148, 429/153, 159, 180
See application file for complete search history.

(56) References Cited

FOREIGN PATENT DOCUMENTS

| | | |
|---|---|---|
| JP | 9-237617 | 9/1997 |
| JP | 10-255735 | 9/1998 |
| JP | 2001-68081 | 3/2001 |
| JP | 2001-283940 | 10/2001 |
| JP | 2001-319697 | 11/2001 |
| JP | 2002-42753 | 2/2002 |
| JP | 2002-141114 | 5/2002 |
| JP | 2003-100273 | * 4/2003 |

* cited by examiner

Primary Examiner—Jonathan Crepeau
Assistant Examiner—Tony Chuo
(74) Attorney, Agent, or Firm—Jordan and Hamburg LLP (57) ABSTRACT

A battery pack includes a plurality of batteries (2) and a plurality of holding frames (3) each of which is capable of accommodating and holding a corresponding one of the batteries (2) with spaces (10a, 10b) provided therein and which are opened on both side faces opposed to each other to form openings. When the holding frames (3) respectively accommodating and holding the batteries (2) are arranged with their openings aligned; end plates (4a, 4b) are arranged at both ends of the holding frames (3); and the end plates (4a, 4b) and the holding frames (3) are jointed as a unit so as to form an outer case (5) that forms a cooling space (6) surrounding each battery (2), a gas-discharge passage portion (18) is provided in each holding frame (3), which seals and covers a space surrounding a gas-discharge port (8) provided in the battery (2) and has connection ports (19a, 19b) opened on both side faces of the holding frame (3).

7 Claims, 5 Drawing Sheets

COMBINED BATTERY AND BATTERY HOLDING FRAME

TECHNICAL FIELD

The present invention relates to a battery pack. More particularly, the present invention relates to a battery pack in which a plurality of batteries are arranged in parallel in an outer case and a cooling space is formed for cooling the batteries within the outer case.

BACKGROUND ART

In recent years, expectation for electric vehicles or hybrid electric vehicles has increased because of the global environmental problems. For rechargeable batteries as the power supply of those vehicles, both reduction in the size and weight and increase of the capacity and output are demanded. Thus, a battery pack in which a plurality of batteries formed by cells are connected in series is used as the power supply. Moreover, a battery pack in which, in order to cool respective batteries, the batteries are arranged in parallel in an outer case and a cool air from the vehicle interior is introduced by a fan into the outer case is known from Japanese Patent Laid-Open Publication No. 2001-319697, for example.

In such a structure, when any trouble occurs in the battery and gas is discharged from the battery via a gas-discharge port provided in the battery, that gas collects in the outer case. That collecting gas may flow back to the vehicle interior while the fan stops.

In order to solve this problem of the collecting gas, Japanese Patent Laid-Open Publication No. 10-255735 discloses a battery pack in which a plurality of hollow bulkheads are provided for supporting the batteries while the gas-discharge ports provided on end faces of the respective batteries are arranged in an inner space. The gas discharged from the battery is discharged to the outside of the vehicle through an exhaust tube connected to each bulkhead.

However, the structures mentioned above have the following problems. First, in the structure disclosed in Japanese Patent Laid-Open Publication No. 2001-319697, the number of the batteries provided in the outer case is fixed. Therefore, in order to deal with various output voltages, it is necessary to change the specification of the outer case, thus increasing the cost. Moreover, as described above, the gas discharged from the battery when the battery falls into abnormal state is not discharged to the outside of the vehicle without fail.

In the structure disclosed in Japanese Patent Laid-Open Publication No. 10-255735, in order to cool the batteries, it is necessary to place the batteries in the outer case while the bulkheads support the respective batteries and to provide an air-blow chamber and an exhaust chamber so as to allow the cool air to flow in the surrounding of each battery between the bulkheads. In addition, in order to deal with various output voltages, it is necessary to change the specification of the bulkhead, the outer case or the chamber. Furthermore, it is necessary to connect the exhaust tube to each of the bulkheads. Thus, the structure is complicated and the number of parts of the structure is large, increasing the cost.

Therefore, the present invention was made in view of the aforementioned problems of the conventional techniques, and aims to provide a battery pack and a holding frame used in that battery pack, which enable effective cooling of each battery, allow the battery pack having a desired output voltage to be easily formed, is easy and reliable to assemble, provides a simple structure at a low cost, and surely separates and discharges gas discharged from the battery in the battery pack when the battery falls into abnormal state.

DISCLOSURE OF THE INVENTION

A battery pack of the present invention includes a plurality of batteries and a plurality of holding frames capable of accommodating and holding the batteries, respectively, so as to provide spaces therebetween, both side faces of each of the holding frames, that are opposed to each other, being opened to form openings. In the battery pack, the holding frames that accommodate and hold the batteries, respectively, are arranged with their openings aligned. At both ends of the arranged holding frames, end plates are arranged that are jointed together with the holding frames as one unit. The holding frames and the end plates that are jointed form an outer case for accommodating the plurality of batteries and for forming a cooling space to surround each battery. By making a cooling medium flow in the cooling space within the outer case formed by the holding frames and the end plates, it is possible to effectively cool the respective batteries, thereby improving the output characteristics and the battery life. Moreover, only by changing the number of the holding frames each accommodating and holding the battery, a desired output voltage of the battery pack is obtained easily. Furthermore, because the structure of the battery pack is formed by a required number of batteries, the same number of holding frames of the batteries and the end plates arranged at both ends, the assembly is done easily and reliably at a low cost.

A battery pack may include a plurality of batteries each having an oval or oblong cross-sectional shape and a plurality of holding frames each of which accommodates and holds each of the batteries therein with spaces provided outside both ends of the battery in the longitudinal direction and outside one side face of the battery, each of the holding frames being formed by a rectangular frame having opened side faces that face both side faces of the battery. In the battery pack, the holding frames that accommodate and hold the batteries, respectively, are arranged with the opened side faces thereof aligned. At both ends of the arranged holding frames, end plates are arranged that are jointed together with the holding plates as one unit. The holding frames and the end plates that are jointed form an outer case for accommodating the plurality of batteries therein and for forming cooling spaces outside both ends of the respective batteries and between the side faces of the respective batteries. Thus, it is possible to form the battery pack having the advantageous effects described above by using a plurality of batteries each having an oval or oblong cross-sectional shape. Moreover, by making the cooling medium flow along the side faces of the batteries from one ends of the batteries to the other ends, it is possible to effectively cool each battery so as to improve the output characteristics and the battery life.

Moreover, in a case where each of the holding frames is provided with a gas-discharge passage portion for sealing and covering a space surrounding a gas-discharge port provided in the battery and having connection ports opened at both side faces of that holding frame, when the battery pack is formed, the connection ports of the gas-discharge passage portions of the holding frames are connected in turn so as to form a gas-discharge passage in the outer case, which is separated from the cooling passage. Therefore, it is possible to surely separate and discharge gas discharged from the gas-discharge port when the battery falls into abnormal state to the outside through this gas-discharge passage.

In addition, in a case where connection terminals are provided in each battery and a space for allowing the connection terminals to be arranged therein is formed in each holding frame, it is possible to easily connect the connection terminals of the batteries held by the holding frames within the space in the holding frames in turn.

A holding frame of the present invention is formed by a rectangular frame that accommodates and holds a battery having an oval or oblong cross-sectional shape and has opened side faces that are opposed to both side faces of the battery. In the holding frame, spaces are provided outside both ends of the battery in the longitudinal direction of the battery and outside at least one side face of the battery, while the holding frame accommodates and holds the battery. By using this holding frame, it is possible to form the battery pack that achieves the aforementioned advantageous effects.

Moreover, by providing the holding frame with a gas-discharge passage portion for sealing and covering a space surrounding a gas-discharge port provided in the battery and having connection ports opened at both side faces thereof, gas discharged from the battery when the battery falls into abnormal state is separated and discharged in the aforementioned manner.

BEST MODE FOR CARRYING OUT THE INVENTION

A battery pack according to an embodiment of the present invention will be described hereinafter, with reference to FIGS. 1 through 7.

Figure 1:
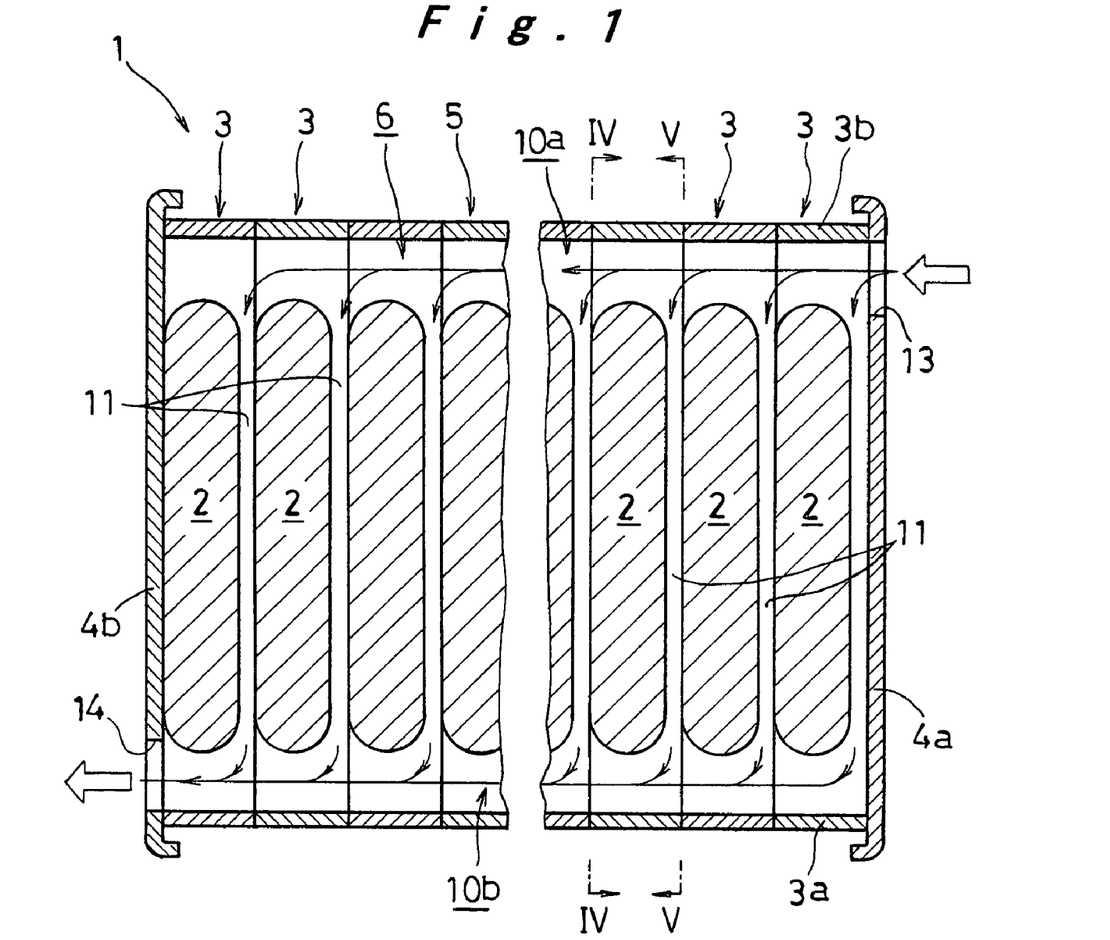
FIG. 1 is a cross-sectional plan view of a battery pack according to an embodiment of the present invention.
Figure 2:
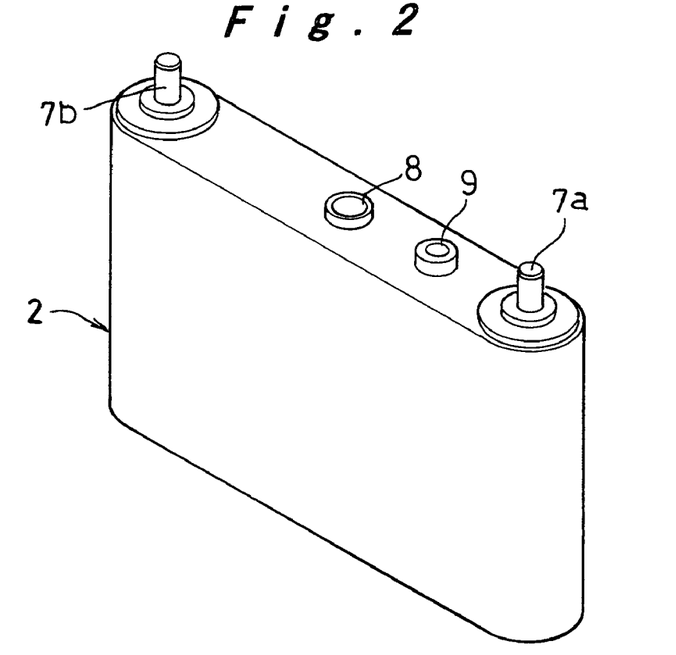
FIG. 2 is a perspective view of a battery in the embodiment of the present invention.
Figure 3:
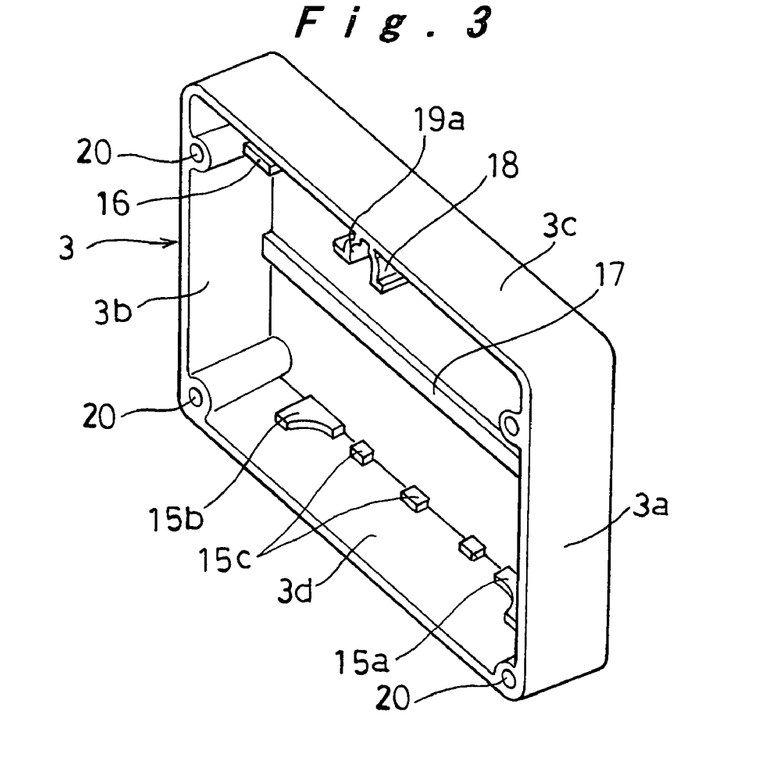
FIG. 3 is a perspective view of a holding frame in the embodiment of the present invention.

As shown in FIG. 1, in a battery pack 1, a battery 2 having an oval or oblong cross-sectional shape as shown in FIG. 2 is held by a holding frame 3 being a rectangular frame as shown in FIG. 3. A required number of the holding frames 3 are arranged in parallel. End plates 4a and 4b are provided at both ends of the thus arranged holding frames 3. The end plates 4a and 4b are fastened so that the end plates 4a and 4b and the holding frames 3 holding the batteries 2 are jointed together as a unit, thereby the battery pack 1 is formed. In the battery pack 1 thus formed, an outer case 5 for forming a cooling space 6 that surrounds each battery 2 is formed by the end plates 4a and 4b arranged at both ends and the plurality of holding frames 3 provided between the end plates 4a and 4b.

On the upper surface of the battery 2, positive and negative connection terminals 7a and 7b are provided at both ends in the longitudinal direction of the upper surface to project from the upper surface. Moreover, a gas-discharge port 8 for discharging gas when a battery falls into abnormal state is provided on the upper surface of the battery 2 around the center in the longitudinal direction of the upper surface. On one side of the gas-discharge port 8, a sensor-attachment hole 9 to which a temperature sensor is to be attached is provided.

Figure 4:
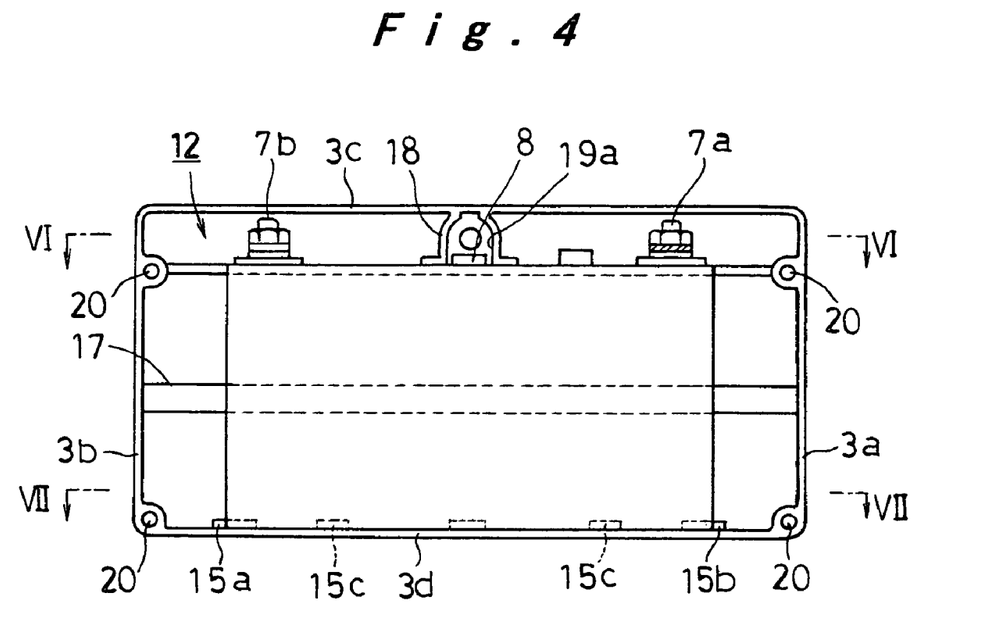
FIG. 4 is a cross-sectional view of the battery pack cut along the line IV-IV in FIG. 1.
Figure 5:
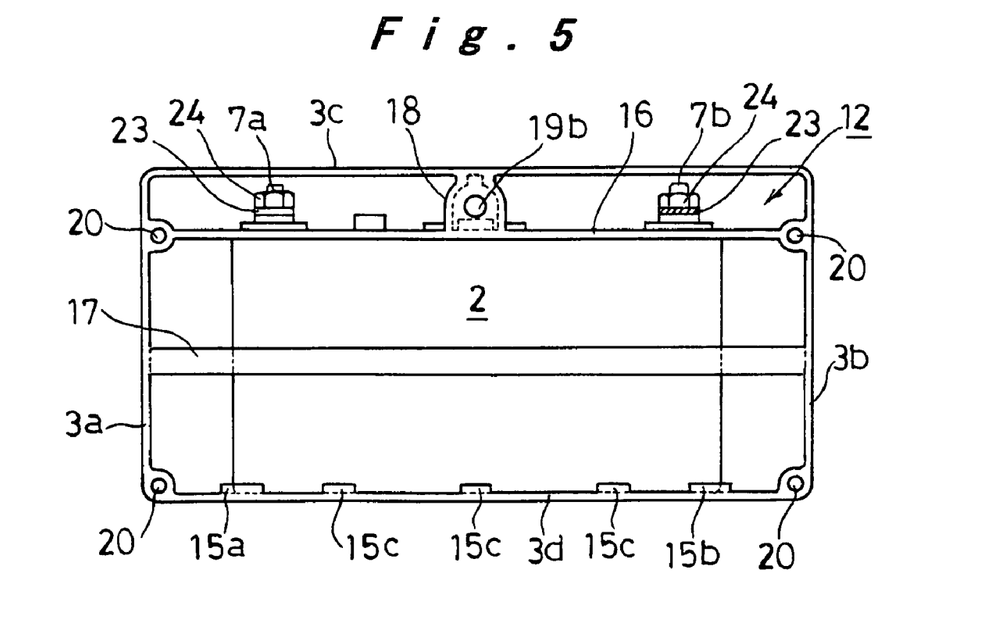
FIG. 5 is a cross-sectional view of the battery pack cut along the line V-V in FIG. 1.

The holding frame 3 is a rectangular frame in which side faces facing both side faces of the battery 2 are substantially entirely opened. As shown in FIGS. 1, 4, and 5, a distributing space 10a and a collecting space 10b that are relatively large are formed between side walls 3a and 3b of the holding frames 3 and both ends of the batteries 2 in the longitudinal direction of the battery, respectively. Moreover, one side face of the battery 2 is in the same plane with one opening of the holding frame 3, while the opposed side face of the battery 2 is spaced away from the other opening of the holding frame 3 in such a manner that a cooling passage 11 for allowing a cooling medium to flow between the adjacent batteries 2 is provided between that side face of the battery 2 and the opening of the holding frame 3. The distributing space 10a, the collecting space 10b, and the cooling passage 11 form together the cooling space 6. In addition, an upper-part space 12 in which the connection terminals 7a and 7b of the battery 2 are arranged is formed between the upper wall 3c of the holding frame 3 and the upper surface of the battery 2. Furthermore, a cooling-medium inlet 13 that communicates with the distributing space 10a is provided in one end plate 4a, and a cooling-medium outlet 14 that communicates with the collecting space 10b is provided in the other end plate 4b.

Figure 6:
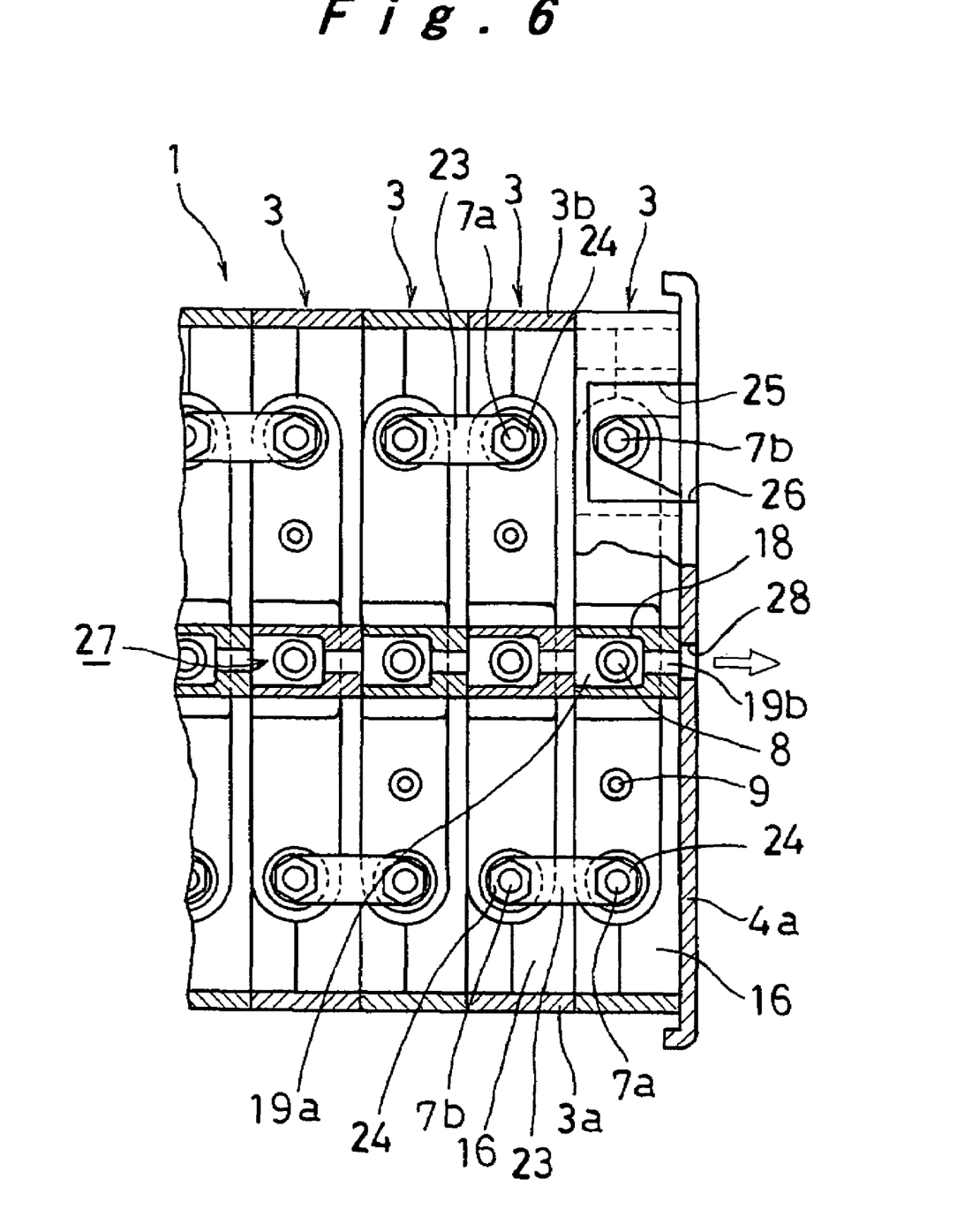
FIG. 6 is a partial cross-sectional view of the battery pack according to the embodiment of the present invention, cut along the line VI-VI in FIG. 4.
Figure 7:
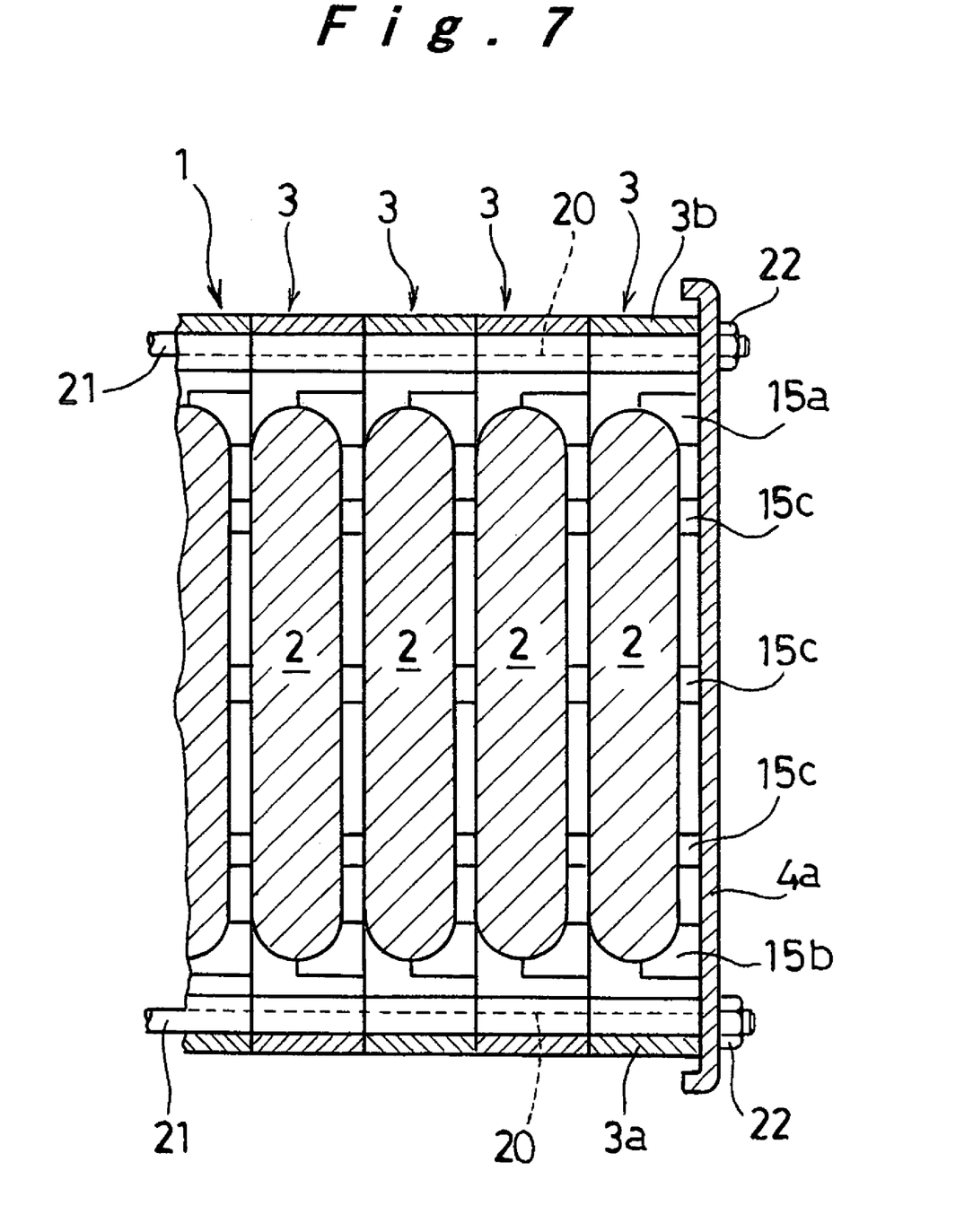
FIG. 7 is a partial cross-sectional view of the battery pack according to the embodiment of the present invention, cut along line VII-VII in FIG. 4.

On the inner surface of the lower wall 3d of the holding frame 3, positioning protrusions 15a, 15b, and 15c are provided for positioning the battery 2 so as to form the distributing space 10a, the collecting space 10b, and the cooling passage 11 when the battery 2 is inserted into the holding frame 3 from one opening of the holding frame 3, as shown in FIGS. 4, 5, and 7. The positioning protrusions 15a and 15b engage with both ends of the battery 2 and the positioning protrusions 15c engage with the center portion of the battery 2. Similarly, a positioning plate 16 for engaging with the upper end of the battery 2 is provided at a level corresponding to the level of the upper end of the battery 2, so as to extend between the sidewalls 3a and 3b of the holding frame 3, as shown in FIGS. 4 through 6. Moreover, an expansion limiting beam 17 for engaging with the other side face of the battery 2 to prevent expansion of both side faces of the battery 2 is provided at an intermediate level between the lower wall 3d and the positioning plate 16 in such a manner that the beam 17 extends between the both sidewalls 3a and 3b of the holding frame 3, as shown in FIGS. 3 through 5.

On the inner surface of the upper wall 3c of the holding frame 3, a gas-discharge passage portion 18 is provided at the center of that inner surface, which surrounds a gas-discharge port 8 of the battery 2 inserted into the holding frame 3 from one opening of the holding frame, from three directions, as shown in FIGS. 4 through 6. The lower end face of the gas-discharge passage portion 18 comes into close contact with the upper surface of the battery 2 in a tightly sealing manner. By providing this gas-discharge passage portion 18, the space surrounding the gas-discharge port 8 is covered and sealed. Moreover, at both ends of the gas-discharge passage portion 18, connection ports 19a and 19b are provided in such a manner that the connection port 19a of each holding frame 3 is connected to the connection port 19b of the adjacent holding frame 3 when the holding frames 3 are arranged in parallel to be in close contact with each other.

As shown in FIGS. 3 through 5, and 7, fastening holes 20 are formed at four positions in the holding frame 3 and the end plates 4a and 4b to extend through the holding frame 3 and the end plates 4a and 4b. The four positions correspond to both ends of the lower wall 3c of the holding frame 3 and both ends of the positioning plate 16. At each of those four positions, a binding shaft 21 is inserted into the fastening holes 20 of the holding frames 3 arranged in parallel and those of the end plates 4a and 4b arranged at both ends of the holding frames 3, so as to be extend through those fastening holes 20. By screwing nuts 22 and both ends of each binding shaft 21 together, the battery set 1 is formed.

In the battery set 1 thus formed, the batteries 2 are arranged in the corresponding holding frames 3 in such a manner that the positive-electrode connection terminals 7a and the negative-electrode connection terminals 7b are alternately arranged along the direction in which the batteries 2 are arranged. The positive-electrode connection terminal 7a and the negative-electrode connection terminal 7b of the adjacent batteries 2 are connected by a connection plate 23 that is bridged between those connection terminals 7a and 7b. The connection plate 23 is screwed onto those connection terminals 7a and 7b with nuts 24. In this manner, the batteries 2 are connected in series. One of the connection terminals 7a and 7b of the battery 2 at each end of the battery pack 1, to which the connection plate 23 is not connected, is used as an output terminal of the battery pack 1. As shown in FIG. 6, in order to expose these connection terminals 7a and 7b serving as the output terminals to the outside, concave portions 25 are formed in the holding frames 3 arranged at both ends of the battery pack 1 and a notch 26 is formed in each of the end plates 4a and 4b.

Moreover, as shown in FIG. 6, in the battery pack 1 thus formed, the gas-discharge passage portions 18 of the holding frames 3 are connected to each other via the connection ports 19a and 19b provided at both ends thereof, thereby forming a gas-discharge passage 27. One end of the gas-discharge passage 27 is connected to an exhaust tube (not shown) via a discharge hole 28 formed in either one of the end plates 4a and 4b, so that gas is discharged to a desired portion in the outside.

The battery pack 1 described above is assembled in the following manner. Sealing agent is applied to surfaces of each holding frame 3 that are to be bonded to the adjacent holding frame 3, surfaces of the end plates 4a and 4b that are to be bonded to the holding frames 3, and the lower end face of the gas-discharge passage portion 18 of the holding frame 3 that is to be in contact with the upper surface of the battery 2, and a region in the upper surface of the battery 2 that is to be in contact with the gas-discharge passage portion 18, if necessary. Then, a required number of the batteries 2 are placed in the holding frames 3, respectively. The holding frames 3 with the batteries 2 are then arranged in parallel in such a manner that the positive-electrode connection terminal 7a and the negative-electrode connection terminal 7b that are adjacent to each other are connected by the connection plates 23 in turn to connect the batteries 2 in series. Then, the end plates 4a and 4b are arranged at both ends of the thus arranged holding frames 3, and the binding shafts 21 are inserted into the fastening holes 20, respectively. By screwing the nuts 22 to both ends of each binding shaft 21, the holding frames 3 and the end plates 4a and 4b are jointed together as a unit. Thus, the assembly of the battery pack 1 is finished.

In a case where the battery pack 1 formed in the above-described manner is used as a driving power supply of an electric vehicle, for example, when an air in the vehicle interior is supplied as a cooling medium to the cooling-medium inlet 13 formed in the end plate 4a by means of a blower fan (not shown), a cool air serving as the cooling medium flows from the distributing space 10a at one end of the battery 2 to the cooling passages 11 between the respective batteries 2, then collects in the collecting space 10b at the other end of the battery 2, and is finally discharged to the outside of the vehicle from the cooling-medium outlet 14 formed in the end plate 4b. In this manner, the cool air flows uniformly in the cooling passages 11 between the batteries 2. Thus, each battery 2 is cooled from both side faces effectively and therefore the temperature increase in each battery 2 is prevented reliably. This ensures the output characteristics and battery life of the battery 2.

On the other hand, when the battery 2 falls into abnormal state and gas is discharged from the gas-discharge port 8, the gas flows through the gas-discharge passage 27 formed separately from the cooling passage 11 by the gas-discharge passage portions 18 respectively formed in the holding frames 3, and is then discharged from the discharge hole 28 of the end plate 4a to the outside of the vehicle through an exhaust tube (not shown) or the like. Therefore, it is possible to reliably prevent a trouble caused by a reverse flow of the discharged gas that flows in the supply passage of the cooled air into the vehicle interior.

According to the present embodiment, by making the cooling medium flow in the cooling space 6 within the outer case 5 formed by a plurality of holding frames 3 and the end plates 4a and 4b, each battery 2 is effectively cooled and the output characteristics and the battery life of the battery 2 are improved. In addition, a battery pack 1 having a desired output voltage will be easily formed only by changing the number of the holding frames 3 respectively holding the batteries 2. Moreover, since the battery pack 1 of the present embodiment has a simple configuration including a required number of batteries 2, the same number of holding frames 3 for holding those batteries 2 and the end plates 4a and 4b arranged at both ends of those batteries 2, the assembly is made easily and reliably at a low cost.

Especially, the battery 2 having an oval or oblong cross-sectional shape is accommodated in and held by the holding frame 3 while the distributing space 10a and the collecting space 10b are provided outside both ends of the battery 2 in the longitudinal direction thereof, and the cooling passage 11 is provided outside one side face of the battery 2. Therefore, the cooling medium flows along both side faces of each battery 2 from one end to the other end thereof so as to effectively cool the battery 2, thus improving the output characteristics and the battery life of the battery 2.

Moreover, the gas-discharge passage portion 18 is provided in each holding frame 3, for covering and sealing the space that surrounds the gas-discharge port 8 provided in the battery 2 and having the connection ports 19a and 19b that are opened on both side faces of the holding frame 3, and the gas-discharge passage portions 18 form together the gas-discharge passage 27 separated from the cooling space 6 within the outer case 5 when the battery pack 1 has been formed. Therefore, it is possible to separate and discharge the gas discharged from the gas-discharge port 8 of the battery 2 when the battery 2 falls into abnormal state to the outside through the gas-discharge passage 27 reliably.

Furthermore, the connection terminals 7a and 7b are provided on the upper surface of each battery 2 at both ends to project therefrom, and the upper-part space 12 in which the connection terminals 7a and 7b are to be arranged is formed in each holding frame 3. Therefore, it is possible to easily connect the connection terminals 7a and 7b of the batteries 2 held by the holding frames 3 in the upper-part spaces 12 of the holding frames 3 in turn, thereby obtaining the battery pack 1 in which a plurality of batteries 2 are electrically connected in series.

Industrial Applicability

As described above, according to the present invention, when a plurality of holding frames each accommodating and holding a battery are arranged with their openings aligned and are jointed as a unit together with end plates arranged at both ends of the holding frames, an outer case is formed for forming a cooling space that surrounds each battery. Therefore, by making a cooling medium flow in the cooling space within the outer case, it is suitable for effectively cooling each battery so as to improve output characteristics and battery life of the battery. It is also suitable for easily forming a battery pack having a desired output voltage only by changing the number of holding frames each accommodating and holding the battery. In addition, because the battery pack of the present invention has a simple structure, i.e., is formed by a required number of batteries, holding frames respectively holding those batteries and end plates arranged at both ends of those holding frames, the battery pack is assembled easily and reliably at a low cost.

Furthermore, according to the present invention, a gas-discharge passage portion, which seals and covers a space surrounding a gas-discharge port provided in the battery and has connection ports opened on both side faces of the gas-discharge passage portion, is provided in each holding frame. Thus, when the battery pack is formed, the connection ports of the gas-discharge passage portions of the holding frames are connected one by one, so that a gas-discharge passage is formed within the outer case separately from the cooling passage. Therefore, the present invention is suitable for reliably separating and discharging gas discharged from the gas-discharge port of the battery when the battery falls into abnormal state to the outside through the gas-discharge passage.

The invention claimed is:

1. A battery pack, comprising:
   a plurality of batteries each having ends, side faces, a top surface and connection terminals on the top surface; and
   a plurality of holding frames each having end sides opposed to the battery ends, a top side opposed to the top surface of the battery and side faces opposed to the side faces of the battery,
   wherein each holding frame is capable of accommodating and holding one of the batteries so as to provide spaces between the battery and the holding frame, said spaces including
      spaces between one side face of the battery and one of the holding frame side faces,
      spaces between an outside of the ends of the battery and the opposing end sides of the holding frame, and
      spaces between the top surface of the battery and the top side of the holding frame extending from each connection terminal to the nearest end side of the holding frame, wherein the top side of the holding frame is located above the connection terminals with respect to an axis drawn from the top surface of the battery to the top side of the holding frame,
   the holding frame side faces that are opposed to each other having openings, wherein the holding frames are set in an arrangement with the holding frame openings aligned, ends of the arrangement being the holding frame side faces that are not opposed to another holding frame side face, wherein at both of the ends of the arrangement end plates are joined together with the holding frames, the holding frames and the end plates forming an outer case for accommodating the plurality of batteries and for forming a cooling space around each battery.

2. A battery pack, comprising:
   a plurality of batteries each having ends, side faces, a top surface, connection terminals on the top surface and an oval or oblong cross-sectional shape in a plane that intersects the ends and side faces of the battery;
   a plurality of holding frames each having end sides opposed to the battery ends, a top side opposed to the top surface of the battery and side faces opposed to the side faces of the battery; and
   end plates, wherein
   each holding frame accommodates and holds one of the batteries with spaces provided between the battery and the holding frame, said spaces including
      first spaces between an outside of the ends of the battery and the end sides of the holding frame, said first spaces extending above a plane defined by the top surface in a longitudinal direction defined by an axis drawn from the top surface of the battery to the top side of the of the holding frame,
      spaces between the top surface of the battery extending from each connection terminal to the nearest end side of the holding frame and the top side of the holding frame, wherein the top side of the holding frame is located above the connection terminals with respect to an axis drawn from the top surface of the battery to the top side of the holding frame, and
      spaces between one side face of the battery and one of the holding frame side faces,
   each of the holding frames having
      a rectangular cross-sectional shape in a plane that intersects the top side and side faces of the holding frame, and
      opened side faces,
   wherein the holding frames are set in an arrangement with the opened side faces of the holding frames aligned, ends of the arrangement being the holding frame side faces that are not opposed to another holding frame side face, at both ends of the arrangement the end plates joined together with the holding plate, the holding frames and the end plates that an outer case for accommodating the plurality of batteries therein and for forming cooling spaces outside both ends of the respective batteries and between the side faces of adjacent batteries.

3. The battery pack according to any one of claims 1 and 2, wherein
   each of the holding frames is provided with a gas-discharge passage portion for sealing and covering a space surrounding a gas-discharge port provided in the battery and having connection ports opened at both side faces of that holding frame.

4. The battery pack according to any one of claims 1 and 2, wherein the holding frames provide space for allowing the connection terminals to be arranged within the holding frames and for allowing connections within the holding frames between the connection terminals of the batteries.

5. A holding frame for a battery, having end sides, a top side and side faces and a rectangular cross-sectional shape in a plane that intersects the top side and side faces of the holding frame, wherein the holding frame accommodates and holds a battery having ends opposed to the holding frame end sides, side faces opposed to the side faces of the holding frame, a top surface opposed to the top side of the holding frame, connection terminals on the top surface and an oval or oblong cross-sectional shape in a plane that intersects the ends and side faces of the battery, wherein the holding frame has opened side faces that are opposed to both side faces of the battery, wherein spaces are provided between the battery and the holding frame, said spaces including
   first spaces between an outside of the ends of the battery and the end sides of the holding frame, said first spaces extending above a plane defined by the top surface in a longitudinal direction defined by an axis drawn from the top surface of the battery to the top side of the of the holding frame and,
   spaces between an outside of at least one side face of the battery.

6. The holding frame for a battery according to claim 5, wherein the holding frame is provided with a gas-discharge passage portion, for sealing and covering a space surrounding a gas-discharge port provided in the battery, and the holding frame having connection ports opened at both side faces of the holding frame.

7. The holding frame for a battery according to any one of claims 1 and 2, wherein each holding frame accommodates and holds only one of the batteries.

* * * * *